(12) United States Patent
Lopushansky et al.

(10) Patent No.: US 7,492,463 B2
(45) Date of Patent: Feb. 17, 2009

(54) METHOD AND APPARATUS FOR CONTINUOUS READOUT OF FABRY-PEROT FIBER OPTIC SENSOR

(75) Inventors: Richard L. Lopushansky, The Woodlands, TX (US); John W. Berthold, Salem, OH (US)

(73) Assignee: Davidson Instruments Inc., The Woodlands, TX (US)

( * ) Notice: Subject to any disclaimer, the term of this patent is extended or adjusted under 35 U.S.C. 154(b) by 84 days.

(21) Appl. No.: 11/105,651

(22) Filed: Apr. 14, 2005

(65) Prior Publication Data

US 2005/0231729 A1    Oct. 20, 2005

Related U.S. Application Data

(60) Provisional application No. 60/562,430, filed on Apr. 15, 2004.

(51) Int. Cl.
*G01B 9/02* (2006.01)
*G01B 11/26* (2006.01)

(52) U.S. Cl. ...................................... 356/480; 356/506
(58) Field of Classification Search .................. 356/478, 356/480, 519, 506; 250/227.19, 227.27
See application file for complete search history.

(56) References Cited

U.S. PATENT DOCUMENTS

| | | | |
|---|---|---|---|
| 3,923,400 A | 12/1975 | Hardy | |
| 4,210,029 A | 7/1980 | Porter | |
| 4,329,058 A | 5/1982 | James et al. | |
| 4,418,981 A | 12/1983 | Stowe | |
| 4,572,669 A | 2/1986 | James et al. | |
| 4,583,228 A | 4/1986 | Brown et al. | |
| 4,606,638 A | 8/1986 | Sommargren | |
| 4,628,211 A | 12/1986 | Ruppert | |
| 4,640,616 A | 2/1987 | Michalik | |
| 4,647,203 A | 3/1987 | Jones et al. | |
| 4,678,909 A | 7/1987 | Jackson et al. | |
| 4,777,358 A | 10/1988 | Nelson | |
| 4,787,741 A | 11/1988 | Udd et al. | |
| 4,806,016 A | 2/1989 | Corpron et al. | |

(Continued)

FOREIGN PATENT DOCUMENTS

EP    0 571 107    * 11/1993

(Continued)

OTHER PUBLICATIONS

Wavelength multiplexing of micromechanical system pressure and temperature sensors using fiber Bragg gratings and arrayed waveguide gratings, Li et al, Optical Engineering, Feb. 2003, pp. 431-438.*

(Continued)

*Primary Examiner*—Samuel A Turner
(74) *Attorney, Agent, or Firm*—McDonald Hopkins LLC (57) ABSTRACT

A pressure measurement system and method are described. The system uses a tunable laser and a Fabry-Perot sensor with integrated transducer. A detector senses the light modulated by the Fabry-Perot sensor. A signal conditioner, which can be located up to 15 km away, then uses the detector signal to determine the displacement of the diaphragm, which is indicative of pressure exerted against the diaphragm. Use of a temperature sensor to generate a signal, fed to the signal conditioner, to compensate for temperature is also contemplated.

18 Claims, 5 Drawing Sheets

Intensity ratio IR(λ,G) versus frequency for various gaps G

U.S. PATENT DOCUMENTS

| | | |
|---|---|---|
| 4,844,616 A | 7/1989 | Kulkarni et al. |
| 4,907,035 A | 3/1990 | Galburt et al. |
| 4,914,666 A | 4/1990 | Glance |
| 4,968,144 A | 11/1990 | Thomas et al. |
| 4,972,077 A | 11/1990 | Willson et al. |
| 4,995,697 A | 2/1991 | Adamovsky |
| 5,034,603 A | 7/1991 | Wilson |
| 5,094,534 A | 3/1992 | Cole et al. |
| 5,177,805 A | 1/1993 | Groger et al. |
| 5,187,546 A | 2/1993 | Johnston |
| 5,202,939 A | 4/1993 | Belleville et al. |
| 5,218,418 A | 6/1993 | Layton |
| 5,225,888 A | 7/1993 | Selwyn et al. |
| 5,239,400 A | 8/1993 | Liu |
| 5,276,501 A | 1/1994 | McClintock et al. |
| 5,283,625 A | 2/1994 | Bunn, Jr. |
| 5,351,317 A | 9/1994 | Weber |
| 5,361,130 A | 11/1994 | Kersey et al. |
| 5,392,117 A | 2/1995 | Belleville et al. |
| 5,401,956 A | 3/1995 | Dunphy et al. |
| 5,401,958 A | 3/1995 | Berkcan |
| 5,444,724 A | 8/1995 | Goto |
| 5,451,772 A | 9/1995 | Narendran |
| 5,473,428 A | 12/1995 | Lee et al. |
| 5,477,323 A | 12/1995 | Andrews et al. |
| 5,509,023 A | 4/1996 | Glance et al. |
| 5,526,114 A | 6/1996 | Eselun |
| 5,557,406 A | 9/1996 | Taylor et al. |
| 5,631,736 A | 5/1997 | Thiel et al. |
| 5,646,762 A | 7/1997 | Delavaux et al. |
| 5,647,030 A | 7/1997 | Jorgenson et al. |
| 5,657,405 A * | 8/1997 | Fujiwara .................... 385/12 |
| 5,682,237 A | 10/1997 | Belk |
| 5,760,391 A | 6/1998 | Narendran |
| 5,784,507 A | 7/1998 | Holm-Kennedy et al. |
| 5,818,586 A | 10/1998 | Lehto et al. |
| 5,835,645 A | 11/1998 | Jorgenson et al. |
| 5,847,828 A | 12/1998 | Downs |
| 5,852,498 A | 12/1998 | Youvan et al. |
| 5,872,628 A | 2/1999 | Erskine |
| 5,910,840 A | 6/1999 | Furstenau |
| 5,923,030 A | 7/1999 | Assard et al. |
| 5,929,990 A * | 7/1999 | Hall .......................... 356/519 |
| 5,949,801 A | 9/1999 | Tayebati |
| 5,986,749 A | 11/1999 | Wu et al. |
| 5,999,261 A | 12/1999 | Pressesky et al. |
| 6,020,963 A | 2/2000 | DiMarzio |
| 6,069,686 A | 5/2000 | Wang et al. |
| 6,075,613 A | 6/2000 | Schermer et al. |
| 6,078,706 A | 6/2000 | Nau et al. |
| 6,088,144 A | 7/2000 | Doerr |
| 6,118,534 A | 9/2000 | Miller |
| 6,122,415 A | 9/2000 | Blake |
| 6,157,025 A | 12/2000 | Katagiri et al. |
| 6,173,091 B1 | 1/2001 | Reich |
| 6,178,001 B1 | 1/2001 | Kim |
| 6,233,262 B1 | 5/2001 | Mesh et al. |
| 6,281,976 B1 | 8/2001 | Taylor et al. |
| 6,282,215 B1 | 8/2001 | Zorabedian et al. |
| 6,289,143 B1 | 9/2001 | Berthold et al. |
| 6,304,686 B1 | 10/2001 | Yamate et al. |
| 6,330,255 B1 | 12/2001 | Hung |
| 6,396,605 B1 | 5/2002 | Heflinger et al. |
| 6,469,817 B1 | 10/2002 | Heflinger |
| 6,486,984 B1 | 11/2002 | Baney et al. |
| 6,490,038 B1 | 12/2002 | Jung et al. |
| 6,492,800 B1 | 12/2002 | Woods et al. |
| 6,496,265 B1 | 12/2002 | Duncan et al. |
| 6,501,551 B1 | 12/2002 | Tearney et al. |
| 6,538,748 B1 | 3/2003 | Tucker et al. |
| 6,539,136 B1 | 3/2003 | Dianov et al. |
| 6,545,760 B1 | 4/2003 | Froggatt et al. |
| 6,552,799 B1 | 4/2003 | Wright et al. |
| 6,563,968 B2 | 5/2003 | Davis et al. |
| 6,583,882 B2 | 6/2003 | Scruggs et al. |
| 6,597,458 B2 | 7/2003 | Tayag et al. |
| 6,608,685 B2 | 8/2003 | Wood et al. |
| 6,621,258 B2 | 9/2003 | Davidson et al. |
| 6,633,593 B2 | 10/2003 | Ksendzov et al. |
| 6,636,321 B2 | 10/2003 | Bohnert |
| 6,687,011 B1 | 2/2004 | Lee et al. |
| 6,714,566 B1 | 3/2004 | Coldren et al. |
| 6,717,965 B2 | 4/2004 | Hopkins, II et al. |
| 6,735,224 B2 | 5/2004 | Murray et al. |
| 6,741,357 B2 | 5/2004 | Wang et al. |
| 6,747,743 B2 | 6/2004 | Skinner et al. |
| 6,798,940 B2 | 9/2004 | Lee et al. |
| 6,806,961 B2 | 10/2004 | Hill |
| 6,822,979 B2 | 11/2004 | Daiber |
| 6,825,934 B2 | 11/2004 | Baney et al. |
| 6,829,259 B2 | 12/2004 | Pontis et al. |
| 6,839,131 B2 | 1/2005 | Kwon |
| 6,842,254 B2 | 1/2005 | Van Neste et al. |
| 6,879,421 B2 * | 4/2005 | Clark et al. .................. 356/519 |
| 6,882,428 B2 | 4/2005 | Baney et al. |
| 2002/0015155 A1 | 2/2002 | Pechstedt et al. |
| 2002/0109081 A1 | 8/2002 | Tarvin et al. |
| 2002/0191294 A1 | 12/2002 | Duggan |
| 2003/0007522 A1 | 1/2003 | Li et al. |
| 2003/0020926 A1 | 1/2003 | Miron |
| 2003/0039428 A1 | 2/2003 | Okamoto et al. |
| 2003/0053069 A1 | 3/2003 | Motamedi et al. |
| 2003/0072009 A1 | 4/2003 | Domash et al. |
| 2003/0076505 A1 | 4/2003 | Bao et al. |
| 2003/0128917 A1 | 7/2003 | Turpin et al. |
| 2003/0132375 A1 | 7/2003 | Blazo |
| 2003/0141440 A1 | 7/2003 | Kim et al. |
| 2003/0142702 A1 | 7/2003 | Pontis et al. |
| 2003/0147067 A1 | 8/2003 | Woodside et al. |
| 2003/0161360 A1 | 8/2003 | Johnson |
| 2003/0223073 A1 | 12/2003 | Van Wiggeren et al. |
| 2003/0231844 A1 | 12/2003 | Kersey et al. |
| 2004/0013356 A1 | 1/2004 | Wang et al. |
| 2004/0071383 A1 | 4/2004 | Balachandran et al. |
| 2004/0119981 A1 | 6/2004 | May |
| 2004/0136415 A1 | 7/2004 | Park et al. |
| 2004/0151216 A1 | 8/2004 | Tsai et al. |

FOREIGN PATENT DOCUMENTS

| | | |
|---|---|---|
| EP | 0957345 | 11/1999 |
| WO | WO99/15858 | 4/1999 |

OTHER PUBLICATIONS

Fiber Optic Sensors, Udd, 1991, p. 147.*
Optical Fiber Sensor Technology, Grattan and Meggitt, 2000, pp. 312-313.*
R.L. Johnson, et.al. "Miniature Instrument for the Measurment of Gap Thickness using Ply-chromatic Interferometry", SPIE, vol. 3762, Jul. 1999, pp. 245-253.

* cited by examiner

Figure 4 Intensity ratio IR(λ,G) versus frequency for various gaps G

METHOD AND APPARATUS FOR CONTINUOUS READOUT OF FABRY-PEROT FIBER OPTIC SENSOR

This application claims the benefit of U.S. Ser. No. 60/562,430, filed Apr. 15, 2004.

FIELD AND BACKGROUND OF INVENTION

The present invention relates to a Fabry-Perot fiber optic sensor and, more particularly, to a high finesse Fabry-Perot sensor and tunable laser combination system for measuring small displacements.

Low finesse Fabry-Perot interferometers have a reflectivity of approx. 50% or less. Such interferometers have been used in sensors in order to provide an indication as to the displacement of a gap between two reflective surfaces. For example, U.S. Pat. No. 5,276,501 to McClintock et al. describes a low-finesse Fabry-Perot fiber optic sensor that uses a laser of limited tuning range. The laser itself is tuned via temperature control to operate at two different wavelengths. Notably, reflectivity of the sensor is in the range of 4%, and the readout from the sensor is approximated as a two beam interferometer so that the gap length is a function of wavelength difference and the interference from the additional multiple reflected beams is neglected. While this type of two-beam interferometer approximation may serve the purposes of the McClintock patent, the inventors have accounted for the fact that interference patterns from Fabry-Perot interferometers are not periodic. Consequently, the teachings of the McClintock patent do not apply to Fabry-Perot sensors in the art, especially with respect to the methodology used to perform the calculation of gap length.

Notably, both with respect to the McClintock patent and the other prior references known to the inventors, the range of gaps measurable by prior art laser-based Fabry-Perot sensors were limited in practice by the wavelength and tuning range of the laser. Other errors in such systems resulted from laser instabilities and inability to precisely measure and control laser wavelength.

Given the above limitations and shortcomings of the prior art, a system that is capable of measuring absolute values and monitor small changes in gaps in real time (i.e., at fast scan rates exceeding 2 Hz) would be welcome by the industry. Moreover, a high-finesse system to enable accurate calculations according to true Fabry-Perot equations is needed.

SUMMARY OF INVENTION

The present invention addresses the aforementioned needs within the industry by providing an accurate system using a tunable laser light source and a Fabry-Perot sensor configured as a transducer. The Fabry-Perot sensor receives and modulates the laser light, and the light is tunable over a range of frequencies. The modulated light is then detected via an InGaAs element (or similar detector means sensitive to the selected wavelengths of the laser). The detector generates a signal based upon the intensity ratio of the modulated laser light, and the detector signal is fed to the signal conditioner. To insure accuracy, the temperature of the Fabry-Perot sensor in the pressure transducer may be monitored with a second Fabry-Perot temperature sensor. The detector signal, and optionally the temperature signal, are provided to a signal conditioner, which identifies two frequency minima in the intensity ratio and generates an output indicative of displacement between the reflective surfaces of the transducer. Preferably, the frequency range of the tunable laser is between 187.5 THz and 200 THz (or 1500 to 1600 nm in wavelength).

A method for monitoring and quantitatively measuring small displacements in a Fabry-Perot sensor is also contemplated. The method includes interrogating the reflective surfaces bounding a variable unknown gap in the Fabry-Perot sensor using a frequency-tunable laser light. The laser light is provided over a range of frequencies, and the intensity of the laser light modulated by the Fabry-Perot sensor is monitored to identify at least two minima. An absolute value of the distance of the unknown gap can then be calculated from these minima. In turn, the absolute value for the unknown variable gap may be used to calculate and monitor an environmental parameter of the Fabry-Perot sensor—most likely the pressure applied to one of the reflective surfaces in the sensors. Optional temperature correction and/or laser pulsing can be performed to enhance the performance of the system. Additional interrogation of the sensor over a reduced range of laser frequencies for fast scan monitoring of the variable gap is also contemplated.

DESCRIPTION OF THE PREFERRED EMBODIMENTS

This invention is a new approach for using fiber optic Fabry-Perot sensors to make high-resolution temperature and pressure measurements at long distances between the sensor and the signal conditioning system. The approach requires a high power, tunable laser that can provide rapid switching in fine increments in narrow wavelength bands with repeatability in the infrared spectral band from 1500 to 1600 nm. Such tunable lasers with very wide tuning range have recently become commercially available. By operating in the 1500 to 1600 nm spectral band where attenuation in optical fiber is very low, high resolution pressure and temperature measurements can be made using Fabry-Perot sensors at remote distances in excess of 10000 meters with update rates of 10 Hz.

Figure 1:
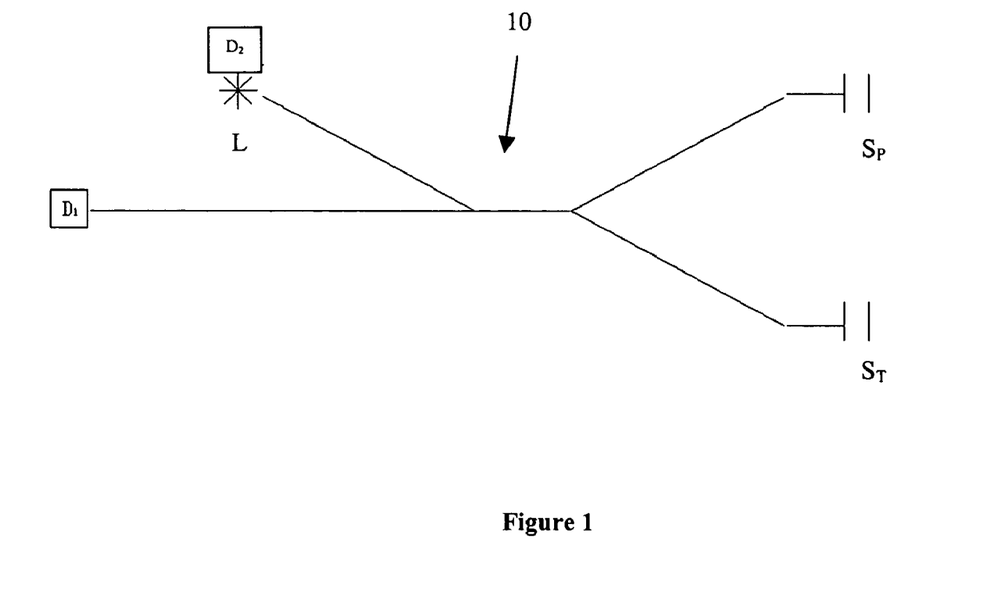
FIG. 1 is a schematic representation of the present invention.

A schematic of the invention 10 is shown in FIG. 1. Infrared light from the laser L is injected into a multimode optical fiber (50 μm/125 μm for example), where it passes through a power splitter and thence to two sensors $S_p$ and $S_T$—one for pressure and one for temperature, respectively. Provided the tuning range of the laser is wide enough, then each sensor $S_p$, $S_T$ may be interrogated at two different wavelength bands within the tuning range of the laser L. If not, then separate tunable lasers with different tuning ranges may be used. Infrared light is reflected from the sensors $S_p$, $S_T$ back to the detector $D_1$ where the light signal is converted to a photocurrent and amplified for processing in a signal conditioner (not shown) connected to the detector. The second Fabry-Perot temperature sensor $S_T$ is provided to track the temperature of the Fabry-Perot pressure sensor. The output of the temperature sensor $S_T$ can be used to correct the pressure sensor output for temperature dependent changes in the pressure sensor gap $S_P$.

Figure 2:
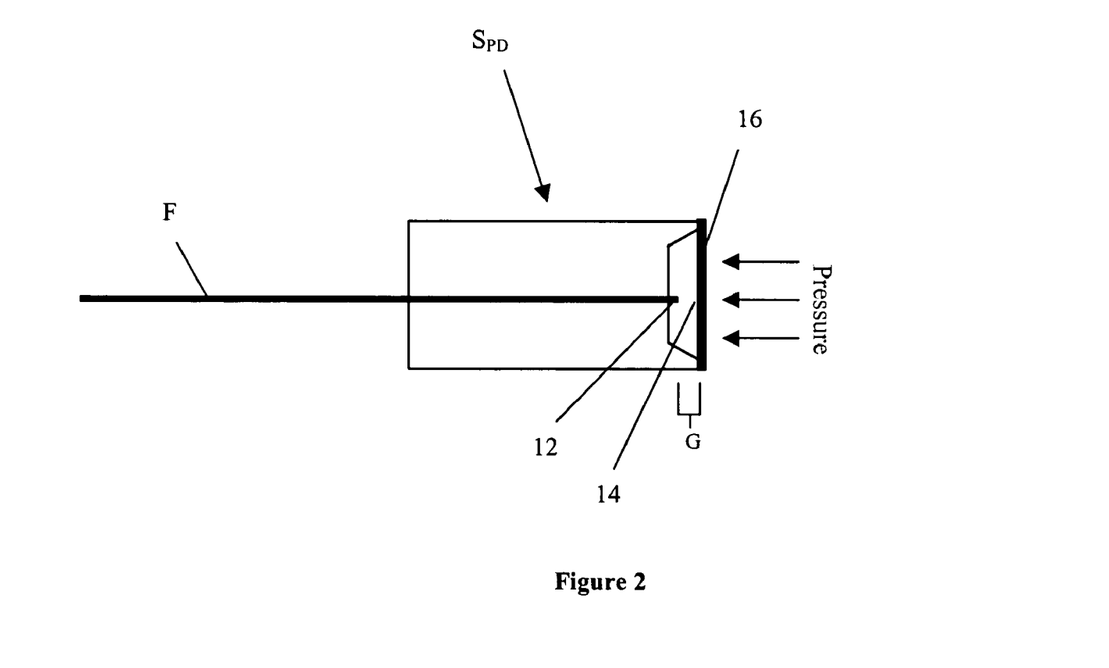
FIG. 2 is a cross sectional representation of the Fabry-Perot sensor used in the present invention.

By way of example, the Fabry-Perot pressure sensor $S_P$ is shown in FIG. 2, specifically configured as a diaphragm-type pressure transducer $S_{PD}$. As known in the art, the general pressure sensor $S_P$ may be configured as a transducer without a diaphragm in other ways, as further described in FIG. 6 below. Infrared light from the tunable laser source is transmitted to the Fabry-Perot sensor through an optical fiber F. The Fabry-Perot senor $S_{PD}$ consists of two reflective surfaces 12, 14 separated by a gap G. The first reflector 12 may be the end of the fiber with a reflective coating or a separate window with reflective coating. In either case, the first reflector 12 is separated from the pressure diaphragm 16 and the second reflector 14 by a gap distance G, which is equal to 80 μm when no pressure is applied for the preferred embodiment. Also, preferably the first reflector 12 is coated with a high reflectance (R=99%) dielectric coating and the second reflector 14 is coated with gold (R=98.5%). Together, the two parallel reflectors 12, 14 separated by gap G comprise a high finesse Fabry-Perot (F-P) interferometer.

Infrared light reflected from the F-P cavity and gap G returns to the signal conditioner (see FIG. 1) where it is detected by the photodiode detector $D_1$. The detector material is InGaAs, which is sensitive in the infrared wavelength band of interest (1500-1600 nm). The pressure transducer $S_{PD}$ may be configured as a circular steel (e.g. Inconel-718) plate (diaphragm) welded around the circumference of the plate to the steel sensor body. When external pressure is applied to the diaphragm 16, it deflects toward the first reflector 12 and the gap G decreases. The radius and thickness of the pressure diaphragm 16 are chosen so that stresses that result are much less than the yield strength of the material. Under these conditions, the deflection d of the center of the diaphragm 16 is a linear function of applied pressure P give by the equation $$d=0.2(Pr^4)/(Et^3) \quad (1)$$

where r is the diaphragm radius t is the diaphragm thickness

E is Young's modulus of the diaphragm material

For a typical working design at P=20000 psi d=8.2×10$^{-4}$ inch (21 μm)

r=0.3 inch t=0.105 inch

E=29×10$^6$ psi

The maximum stress S is given by $$S = 0.8(Pr^2)/t^2 \quad (2)$$
$$= 1.3 \times 10^5 \text{ psi}$$

The infrared light intensity reflected back to the signal conditioner from the F-P cavity is modulated as the diaphragm deflects and the gap G changes. The ratio of the incident-to-reflected intensity $I_R$ is a function of both the laser frequency and the gap G and is given by $$I_R(v,G) = \frac{F\sin^2[(2\pi vG)/c]}{1+F\sin^2[(2\pi vG)/c]} \quad (3)$$

where c=λv is the velocity of light v=1.93×10$^{14}$ Hz is the frequency of the infrared light λ=1550×10$^{-9}$ m (1550 nm) is the wavelength G is the Fabry-Perot gap distance between the first and second reflectors

F=4R/(1−R)$^2$

R=(R$_1$R$_2$)$^{1/2}$ is the composite reflectance of fiber end (R$_1$) and diaphragm (R$_2$)

Figure 3:
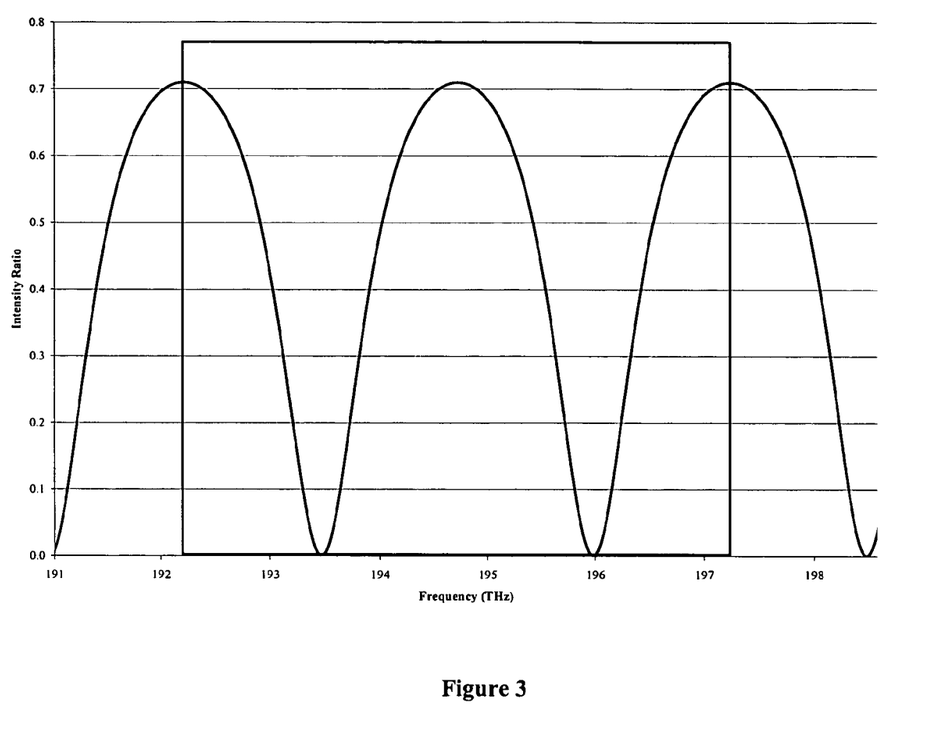
FIG. 3 is a plot of the intensity of the tunable laser light versus the frequency of the tunable laser light when the gap of the Fabry-Perot sensor is equal to 60,062 nm.
Figure 4:
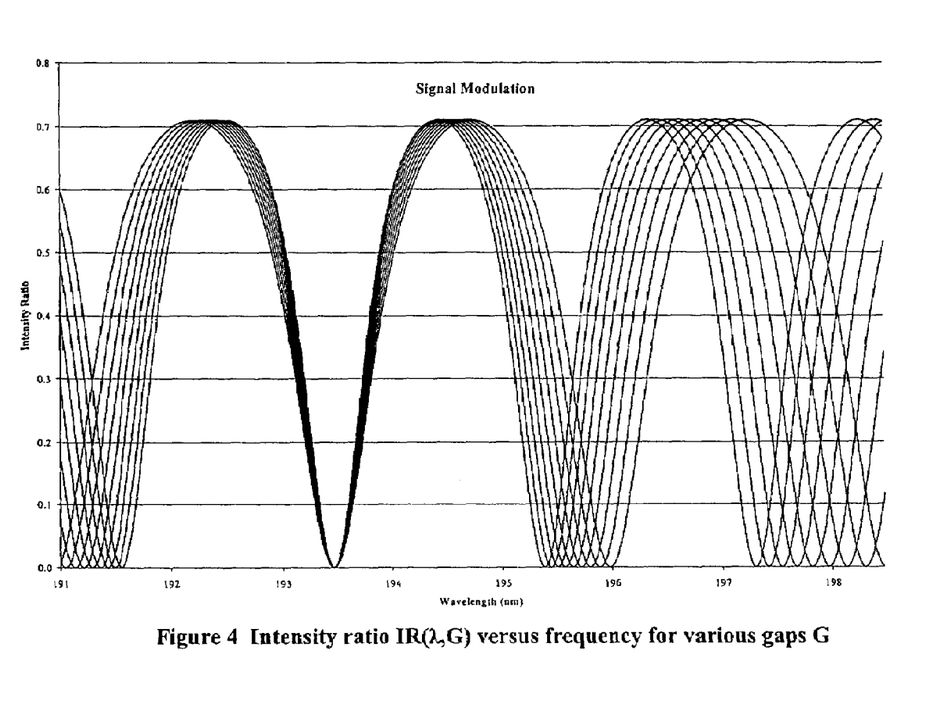
FIG. 4 is similar to the plot of FIG. 3, excepting that FIG. 4 shows the intensity versus frequency plots over a range of differing gaps.

For illustration purposes in the remaining FIGS. 3 and 4, a composite reflectance of R=30% is assumed, although in the preferred embodiment R>99%. Shown in FIG. 3 is a plot of the intensity ratio $I_R(v,G)$ for a single gap G=60.062 μm. Notably, such an intensity ratio can be generated by normalizing light L provided to sensor $S_P$ (and $S_T$, if appropriate), preferably through the use of detector $D_2$. Shown in FIG. 4 is a plot of the intensity ratio $I_R(v,G)$ for various gaps. Each curve in FIG. 4 represents a different gap. As in FIG. 3 for any given gap G, the reflected intensity ratio measured by the photodiode $D_1$ oscillates through maxima and minima as the laser frequency is tuned through its range. It is important to note from FIG. 4 that for any given gap, the plot of intensity ratio versus frequency is unique. Although the function in Equation 3 is oscillatory, the period is not repetitive, which means that the spectrum at some gap Ga does not overlay any other spectrum for any other gap Gn. Thus, measurement of the separation of the minima or maxima in frequency space uniquely determines the gap to within the system resolution.

Significantly, the inventors were the first to identify and exploit this variation in the intensity ratio versus frequency, as described in Equation 3. Previous methods had presumed this dependence was repetitive. Consequently, these previous methods could not achieve the level of precision for absolute, quantitative measurements attained by the present invention. Moreover, these previous systems could not achieve the fast scan monitoring performed by the present invention.

To maximize the resolution of the system, it is important to match the range of gaps with the tuning range of the laser. For example, given a laser with a tuning range of 20 nm, and a transducer with starting gap at 0 psi pressure of 80 μm, then at 20000 psi pressure, the transducer should be designed to deflect 20 μm and the deflection range is 80 μm to 60 μm. It is necessary that for all gaps in the range 60 to 80 μm, there must be at least two minima in the F-P modulated spectrum (see FIG. 3) within the laser tuning range. The minimum length of the gap depends on the laser operating wavelength and tuning range. For a given wavelength, the wider the tuning range the shorter the minimum allowed gap may be.

Note that the radius and thickness of the diaphragm 16 (as illustrated in the example above, a flat Inconel-718) can be chosen so that at pre-determined deflection distance (and its resulting the maximum stress, S) will be well below the yield strength of the material. Selection of a low stress is also significant because it provides a very repeatable pressure sensor with little or no hysteresis. As used here, hysteresis refers to the graph of sensor gap versus pressure. If hysteresis is present, the gap will follow two different paths—one path when the pressure increases and a different path when the pressure decreases.

An additional source of non-repeatability occurs when the stress in the diaphragm approaches the yield point of the material. When this occurs, the sensor will not produce repeatable results and will need recalibration. Thus, it is desirable to design the transducer $S_{PD}$ so that the stress never approaches the yield point and for this reason, alternate transducer designs would be of great value.

Figure 6:
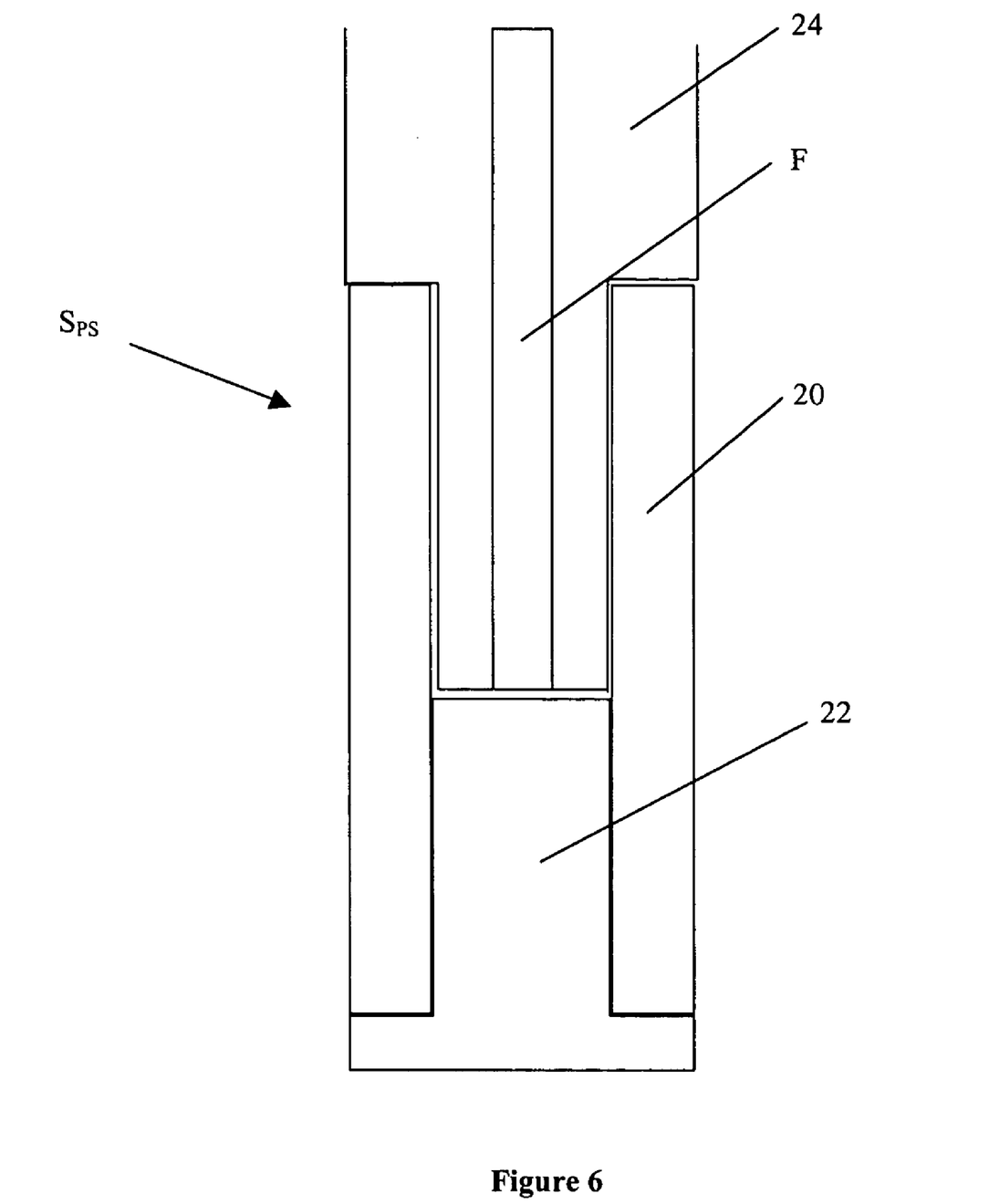
FIG. 6 shows an alternate transducer design wherein the diaphragm is replaced with a plug configuration.

An alternate for sensor $S_P$ is shown as sensor $S_{PS}$ in FIG. 6. The transduction mechanism is created by the compression of a tubular sleeve 20 with a plug 22 in one end. Sleeve 22 is also fitted around the transducer body 24. Reflective surfaces can be provided on fiber F and plug 22, respectively, as discussed above. With this design there is no bending which occurs in the diaphragm design $S_{PD}$. The resulting stress is a fraction of the stress in a diaphragm and results in a more repeatable and durable transducer/sensor.

In the example shown with a tunable laser that operates over the wavelength range 1500 to 1600 nm (which corresponds to a frequency range of 200 THz to 187.5 THz, respectively speaking), it is necessary to design both the pressure and temperature sensors so the minimum gap is approximately 60 um. For all gaps in the range, there must be at least two minima in the F-P modulated spectrum (see FIG. 3) within the laser tuning range, and the minimum length of the gap will depend on the laser's operating wavelength and tuning range. For any given wavelength, a wider tuning range results in a shorter minimally-allowable gap. Later we define an algorithm which determines the gap from the measured data and this algorithm requires that for all gaps there exist at least two minima in the F-P modulated spectrum over the tuning range.

Consider the well-known relationship for a Fabry-Perot (reference Born and Wolf, *Principles of Optics*) with mirror separation G $$\Delta v = c/2G \quad (4)$$

where $v$ is the optical frequency at wavelength $\lambda$ and the velocity of light $c = \lambda v$. The symbol $\Delta$ signifies a small change in the frequency $v$, where $\Delta v = v_2 - v_1$. It follows from the velocity of light that $$\Delta v / v = -\Delta \lambda / \lambda \quad (5)$$

where $v$ is the light frequency and $\lambda$ the wavelength. The minus sign simply means that as the frequency increases the wavelength decreases. Consider a laser with an operating frequency between 192.3 THz ($\lambda = 1560$ nm) and 197.5 THz ($\lambda = 1519$ nm). The laser frequency is tunable with tuning range $\Delta v = 5.2 \times 10^{12}$ Hz. Note that 1 THz=$10^{12}$ Hz. The laser is tuned in a step-wise manner and covers the range in 40000 steps where each step is given by the resolution element $\delta = 1.3 \times 10^8$ Hz. The symbol $\delta$ signifies a much smaller change than the symbol $\Delta$, but the expression in Equation 5 continues to hold. $\delta\lambda$, the resolution element in wavelength is calculated as $$\delta\lambda = (1.3 \times 10^8)(1540 \times 10^{-9}) / (1.95 \times 10^{14}) \quad (6)$$
$$= 1 \times 10^{-12} \text{ meter}$$
$$= 1 \text{ pm}$$

Equation 4 defines the spacing between the minima or spacing between the maxima plotted in FIGS. 3 and 4. Note that for any curve plotted in FIG. 4, the spacing of the maximum and minimum is unique. Consider a laser with a 5.2 THz tuning range that is shining on the Fabry-Perot sensor gap (see FIG. 1). Tune the laser over its range 192.3 THz to 197.5 THz as indicated in FIG. 3. Two minima and two maxima in the reflected light intensity are observed. A precise measurement of the spacing $\Delta v$ between the minima defines the gap G. Several examples are provided in Table 1.

TABLE 1

| Fabry-Perot gap as determined from measurement of $\Delta v$ | | | |
|---|---|---|---|
| $v_2$ THz | $v_1$ THz | $\Delta v = c/2G$ THz | G (nm) |
| 195.3 | 193.3 | 2.00 | 75000 |
| 194.9 | 192.8 | 2.10 | 71429 |
| 194.8 | 192.5 | 2.30 | 65217 |
| 194.8 | 192.4 | 2.40 | 62500 |
| 195.99 | 193.5 | 2.49 | 60241 |

Figure 5:
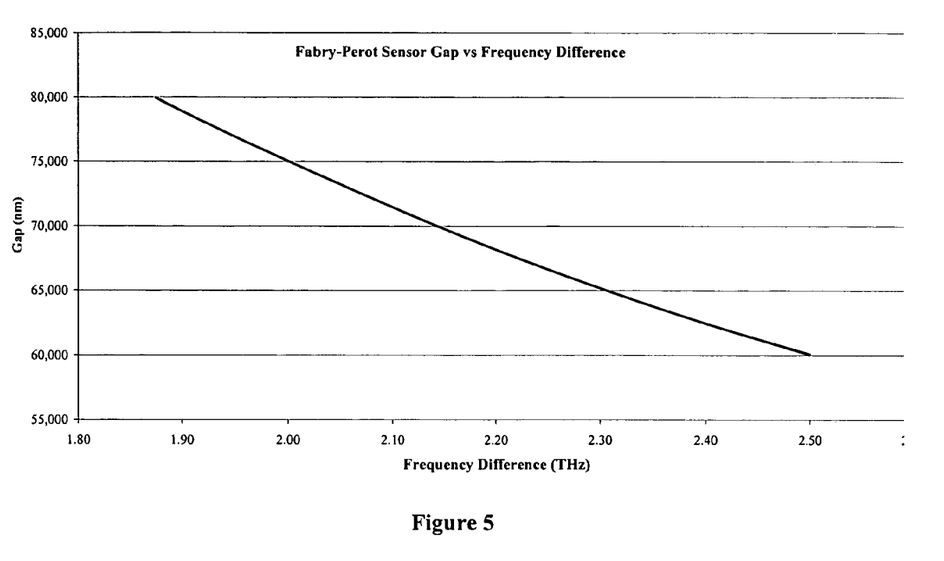
FIG. 5 shows a plot of the Fabry-Perot sensor gap versus the frequency difference.

As long as there are at least two minima in the intensity ratio that are observed when the laser is tuned over its range, it is always possible to measure the gap G uniquely. A calibration plot of sensor gap versus $\Delta v$ is shown in FIG. 5.

The smallest change in the gap that can be measured is determined from Equations 4 and 5. Consider the last case in Table 1 where G=60241 nm and $v_2$=195.99 THz. Calculate $\delta G$ corresponding to the resolution element $\delta v = 1.3 \times 10^8$ Hz $$\delta G = G(\delta v / v) \quad (8)$$
$$= 60241(1.3 \times 10^8) / (195.99 \times 10^{12})$$
$$= 0.04 \text{ nm}$$

For a pressure range of 20000 psi and a diaphragm deflection range of 20000 nm (gap range 80 μm to 60 μm), a deflection resolution of 0.04 nm equates to a pressure resolution of 0.04 psi.

The following specifications are acceptable for the tunable laser of the present invention: tunable laser scans 40,000 steps in 10 sec (and can also scan 400 steps in 0.1 sec); operating scan range is 192.3 THz to 197.5 THz in Laser 1; operating scan range is 186.8 THz to 192 THz in Laser 2; step size is 1 pm/step in wavelength space or 130 MHz/step in frequency space ($c = \lambda v$, where c is velocity of light, $\lambda$ is laser wavelength and $v$ is laser frequency). Additionally, Sensor gap (G) range is 60000 nm to 80000 nm, and the corresponding pressure range is 20000 psi to 0 psi. A dither operation enables tracking of a minimum in the intensity ratio.

An algorithm that details a step-by-step method to determine the size of gap G, and thus the applied pressure (or some other environmental parameter associated with the Fabry-Perot sensor $S_P$), using the tunable laser L is as follows:

1. Interrogate the pressure sensor. Perform 40,000 step scan. Find the frequency minima $v_1$ and $v_2$. Store the step numbers and values of $v_1$ and $v_2$. Calculate $\Delta v = v_1 - v_2$. Calculate Ga (Ga=c/(2$\Delta v$), where Ga is the gap and c is the velocity of light). Note that the location of the minima are determined to 1 pm out of 40,000 pm. The difference in the minima is known to 2 pm. Thus, the gap Ga is known to 80 pm and the pressure is known to 0.08 psi. See Equation (8). For 20,000 psi range, the pressure is determined to one part in 250,000.

2. Once the gap is known, the laser is tuned to the frequency minimum nearest the center of the range and laser frequency scan range is changed to 400 steps per 0.1 sec. In this mode, small changes in diaphragm deflection (pressure) can be tracked at high speed. The pressure update rate in this fast scan mode is 10 Hz.

3. On a periodic basis, repeat step 1.

4. On a periodic basis, interrogate the temperature sensor and calculate the temperature sensor gap $G_T(n)$ using a similar algorithm as in steps 1 and 2.

5. Apply temperature correction factor to pressure measurement.

In summary, the sensor interrogation system consists of a tunable laser that can provide 40,000 separate and adjacent frequency outputs over the band 192.3 THz to 197.5 THz and a photodiode to measure the light intensity reflected from the Fabry-Perot gap in a pressure sensor. The system can provide pressure measurement accuracy less than 0.1 psi. A second Fabry-Perot temperature sensor $S_{PT}$ may also be provided as shown in FIG. 1, although the essence of the invention focuses on the discovery of the non-repetitive nature of the response (as described above). The output of the temperature sensor can be used to correct the pressure sensor output for temperature dependent changes in the pressure sensor gap.

In long distance applications, the sensor may be 5 km, 10 km or 15 km away from the signal conditioner. To ensure that light from the tunable laser reaches the sensor at the end of such long optical fiber cables, high output power is needed. An output power of 1 mW is sufficient and 10 mW is typically available from tunable laser systems. Such large power presents a fundamental problem however. When so much power is injected into the transmission fiber, light is scattered back to the detector. Although the percentage of light scattered back is small, the laser power is large, so that over the first 10 meters or so of fiber length, the amount of light back-scattered causes significant detector noise. An optical time domain reflectometer (OTDR) experiences the same problem, which is why there is a dead band for the first few meters when using an OTDR. The large scattered light signal saturates the detector. One method to minimize or reduce the effect is to pulse the light source.

Light travels about 5 ns/m in optical fiber with refractive index n=1.45. Thus it takes light about 25 µs to travel 5 km, 50 µs to travel 10 km, and 75 µs to travel 15 km. If the laser is turned on and off, then for example, if the range is 10 km, the laser can be turned on for 50 µs and off for 50 µs. The detector can be synchronized with the laser so that when the laser is on the detector is off and when the laser is off the detector is on. For the 50 µs when the laser is on the light travels to the sensor and the detector sees no noise since it is off. For the second 50 µs, the laser is off and the detector sees infrared light reflected from the sensor. With continuous operation in this mode, the laser light is on half the time and off half the time (50% duty cycle) and the detector noise is minimized because it is not exposed to scattered light. If the laser and detector on-time and off-time are continuously adjustable from 25 to 75 µs, then it is possible to adjust for any sensor range between 5 and 15 km.

Numerous methods are available to turn the detector on and off. These include a fast shutter, electro-optic modulator, or a simple electronic circuit to switch on and off the electric current to the laser.

We claim:

1. A system for monitoring and quantitatively measuring displacement of reflective surfaces in a Fabry-Perot sensor, the system comprising:
   a laser providing light tunable over a range of frequencies and tunable at a fast scan rate over a subset of said range of frequencies;
   said Fabry-Perot sensor spanning a variable gap defined by two reflective surfaces, said Fabry-Perot sensor receiving and modulating light interrogating the Fabry-Perot sensor;
   detector means for generating a detector signal from a normalized intensity ratio of light modulated when the laser interrogates the Fabry-Perot senor over the range of frequencies or interrogates the Fabry-Perot sensor at a fast scan rate over the subset of the range of frequencies;
   signal conditioner means for identifying at least two frequency minima in the detector signal when the Fabry-Perot sensor is interrogated over the range of frequencies and monitoring one of the at least two minima in the detector signal when the Fabry-Perot sensor is interrogated at a fast scan rate over the subset of the range of frequencies; and
   calculating means for calculating an absolute value for the variable gap based on the at least two minima and detecting changes in one of the at least two minima when the Fabry-Perot sensor is interrogated at a fast scan rate over the subset of the range of frequencies.

2. A system according to claim 1, wherein the Fabry-Perot sensor comprises a high-finesse Fabry-Perot sensor.

3. A system according to claim 1, wherein the detector means comprises an InGaAs element.

4. A system according to claim 1, further comprising means for pulsing the laser.

5. A system according to claim 4, wherein the means for pulsing the laser is selected from the group consisting of: a fast shutter, an electro-optic modulator and an on/off circuit means for controlling current provided to the laser.

6. A system according to claim 1, wherein the frequency of the laser is tunable between 187.5 THz and 200 THz.

7. A system according to claim 1, wherein at least one of the reflective surfaces is included within a pressure transducer.

8. A system according to claim 1 further comprising:
   a temperature sensor, said temperature sensor generating a temperature signal indicative of a temperature of the Fabry-Perot sensor.

9. A method for monitoring and quantitatively measuring displacement of two reflective surfaces in a Fabry-Perot sensor spanning a gap, said gap having an unknown variable length defined by the two reflective surfaces, the method comprising:
   providing a laser tunable over at least a first range of frequencies;
   interrogating the Fabry-Perot sensor with light from the laser over the first range of frequencies to establish at least two minima in a normalized intensity ratio of laser light modulated by the Fabry-Perot sensor;
   calculating an absolute value of the gap based on the at least two minima;
   calculating an environmental parameter of the Fabry-Perot sensor using the absolute value of the gap;
   fast scanning the Fabry-Perot sensor with light from the a laser over a second range of frequencies, said second range of frequencies being a subset of said first range of frequencies; and
   monitoring laser light modulated by the Fabry-Perot sensor during the fast scanning to detect changes in the environmental parameter.

10. A method according to claim 9 further comprising:
    monitoring a temperature sensor to generate a temperature signal; and
    applying a temperature correction factor in calculating the environmental parameter of the Fabry-Perot sensor.

11. A method according to claim 9, further comprising pulsing the laser light provided to the Fabry-Perot sensor.

12. The method according to claim 9, further comprising generating a signal from the normalized intensity ratio of modulated light.

13. The method according to claim 12, further comprising evaluating the signal to determine the at least two minima.

14. The method according to claim 9, where the second range of frequencies includes at least one of the at least two minima.

15. The method according to claim 9, further comprising generating a signal from the normalized intensity ratio of modulated light during the fast scanning.

16. The method according to claim 15, further comprising monitoring the signal to detect changes in at least one of the at least two minima.

17. The method according to claim 16, further comprising calculating the change in environmental parameter from the detected change in at least one of the at least two minima.

18. The method of claim 9, where the environmental parameter calculated is pressure.

* * * * *